United States Patent [19]

Baghdady

[11] 4,088,955
[45] May 9, 1978

[54] INTERFERENCE REJECTION TECHNIQUE

[76] Inventor: Elie J. Baghdady, 21 Overlook Dr., Weston, Mass. 02193

[21] Appl. No.: 565,591

[22] Filed: Apr. 7, 1975

[51] Int. Cl.² .............................................. H04B 7/02
[52] U.S. Cl. ..................................... 325/56; 325/154; 325/473
[58] Field of Search ...................... 325/473, 59, 56, 63, 325/65, 156, 157, 180, 154, 304, 365, 366, 368, 369, 370, 371, 372; 343/100 CS, 100 SA

[56] References Cited

U.S. PATENT DOCUMENTS 3,821,646   6/1974   Bickford ........................... 325/65 X Primary Examiner—Richard Murray
Attorney, Agent, or Firm—Burns, Doane, Swecker & Mathis

[57] ABSTRACT

This invention relates to interference suppression or reduction means in receiving systems, and more particularly to apparatus for suppressing interference in receiving equipment by locally inducing a sufficiently large frequency difference between a desired signal and an undesired signal arriving from a different direction at the receiving site.

14 Claims, 9 Drawing Figures

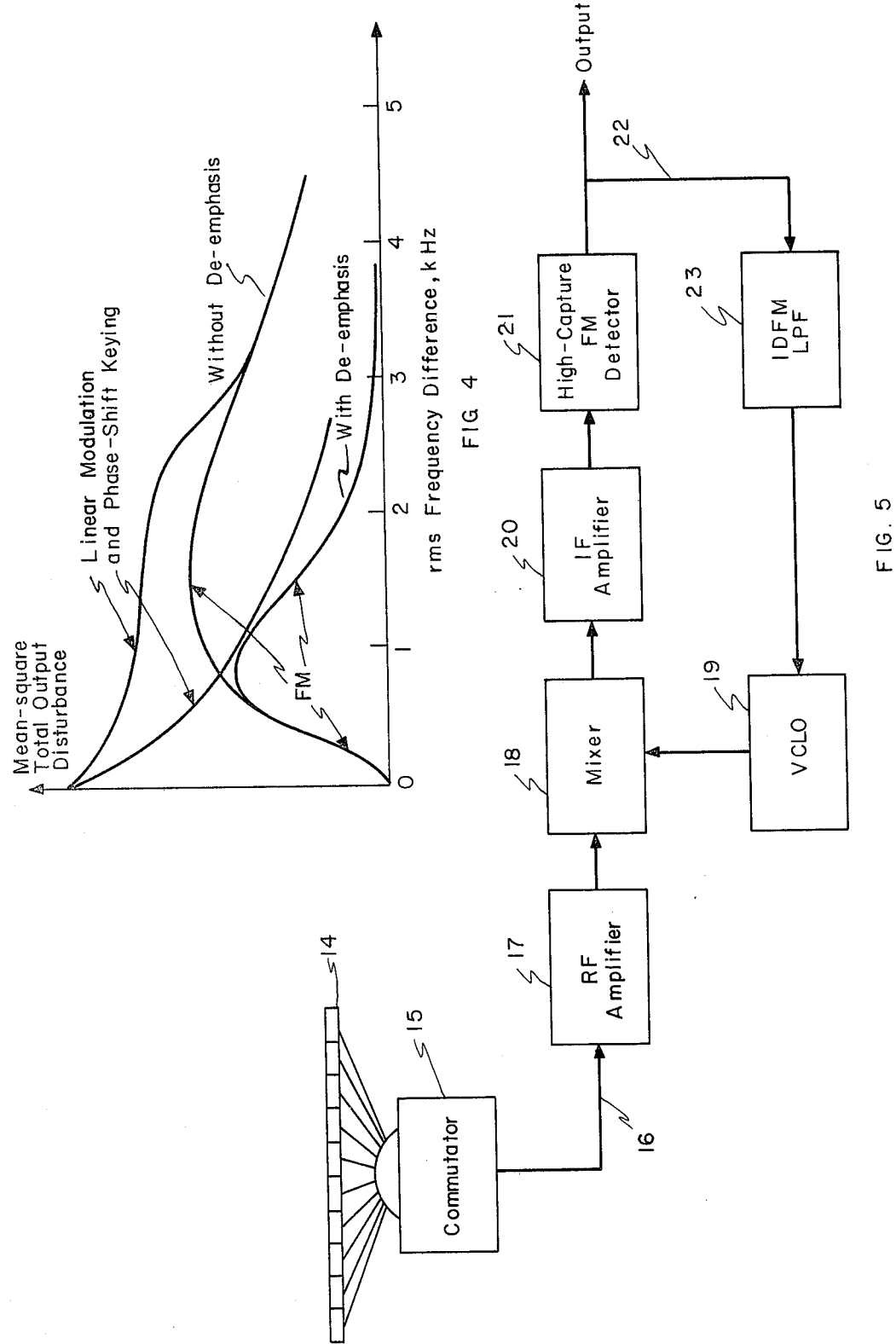

INTERFERENCE REJECTION TECHNIQUE

A number of methods have been described in the patent literature for suppressing or reducing interference in receiving systems caused by unwanted signals or by multipath propagation of the desired signal.

Methods of suppressing or reducing interference in radio receiving systems known in the art are based on one or more of the following:

(a) Frequency difference between the desired and undesired signals that is sufficient to enable receiver selective filters to attenuate the out-of-band signal well below the level of the desired in-band signal;

(b) Difference in the times of occurrence of the desired and undesired signals that is sufficient to enable receiver gating circuits to gate out the undesired signal while passing the desired signal;

(c) Difference in joint time-frequency space occupancy that is sufficient to enable a matched-filter or cross-correlation detector properly matched to the desired signal to effectively suppress the undesired signal;

(d) Orthogonality of signal nd interference waveforms over specified time and frequency intervals, of a more general nature than is described by (a), (b) or (c);

(e) Difference between polarizations of desired and undesired incident waves that is sufficient to enable an antenna that favors the polarization of the desired signal to suppress the undesired signal;

(f) Difference in angles of arrival at the receiving site between desired and undesired signals that is sufficient to enable a directive antenna beam to favor the desired signal or an antenna pattern null to cancel out the undesired signal.

(g) A difference in signal levels coupled with a sufficient but not total difference in frequency or time occupancy (or both) to enable special stronger or weaker-signal capture devices to enhance one or the other of the two signals to dominance in the receiver output.

Although certain advantages may be claimed for the prior art techniques based on the above differences, each of these techniques fails to provide satisfactory discrimination against the interference, or may actually seriously impair the desired signal while suppressing the undesired signal when the differences in question are not sufficient; such as when the desired signal arrives at the receiving site via a multiplicity of propagation paths of nearly equal strengths.

The present invention contemplates overcoming the limitations of the prior art interference suppression techniques by first recognizing the fact that interference from causes beyond the "confines" of a receiving terminal is usually caused by signals arriving from different directions, and hence by providing a means for causing differences in angle of arrival to result in differences in frequency of sufficient magnitudes to enable receiver interference rejection signal processing techniques to discriminate effectively against the undesired signal or signals.

Throughout this disclosure, and in the appended claims, the term "induced directional frequency modulation," abbreviated "IDFM," will be employed to designate direction-dependent frequency modulation of a received signal that is artificially and deliberately induced by pre-planned and accurately pre-specified motions, real or simulated, of a transmitting antenna (or source) or a receiving antenna (or receiver) within "the confines" of a transmitting terminal or of a receiving terminal, as distinguished from relative motion between the two terminals which changes their separation and which is normally created as a result of a purpose or a function not primarily concerned with facilitating the interference rejection function.

Throughout this disclosure and in the appended claims, the abbreviation "IDFM/R" will be employed to designate the case wherein the IDFM is generated by moving the receiving antenna, and the abbreviation "IDFM/T" will be employed to designate the case wherein the IDFM is generated by moving the transmitting antenna.

Throughout this disclosure, and in the appended claims, the terms "line of motion," abbreviated LOM, and "path of motion," abbreviated POM, will be employed to designate a line of fixed length or a curve of specified shape, open or closed, along all or part of which an antenna is moved in some manner to induce direction-dependent frequency modulation in a signal that is either radiated by the moving antenna or received by it.

The term "signal wave" as used herein may comprehend both modulated and unmodulated carrier waves.

In describing interfering signal waves, the phrase "generally the same frequency" may comprehend signal waves having the same carrier frequency or carrier frequencies close enough that the signal waves may be passed by the same receiver pass band.

It is a further object of this invention to provide a method of enhancing the receiver ability to reject interference from multipath and other signals arriving from directions different from the direction of arrival of the desired signal based on modifying the modulation characteristics of the incident signals by means of induced directional frequency modulation (henceforth, IDFM) that contemplates tailoring the frequency differences between the desired and the undesired signals so that an effective degree of capture enhancement of the desired signal is achieved for all types of modulation.

For a better understanding of the invention together with other and further objects thereof, reference is made to the following description taken in conjunction with the accompanying drawings, wherein:

FIG. 1 is a block diagram of one form of interference rejection system in accordance with this invention, including a signal transmitter and one form of receiving scheme for detecting the information borne by the desired signal in the presence of other signals arriving from different directions or of replicas of the same signal emitted by the same transmitter but reaching the receiver over different propagation paths.

FIG. 4 illustrates the variation of total output distortion caused by interference as a function of the rms frequency difference between the desired signal and the interference for a fixed value of the amplitude ratio, $a$.

FIGS. 5 and 6 show more detailed functional block diagrams of two forms of an IDFM interference rejection receiving system for FM including a commutator for simulating a receiving antenna that moves along a rectilinear sequence of positions in accordance with this invention;

Figure 1:
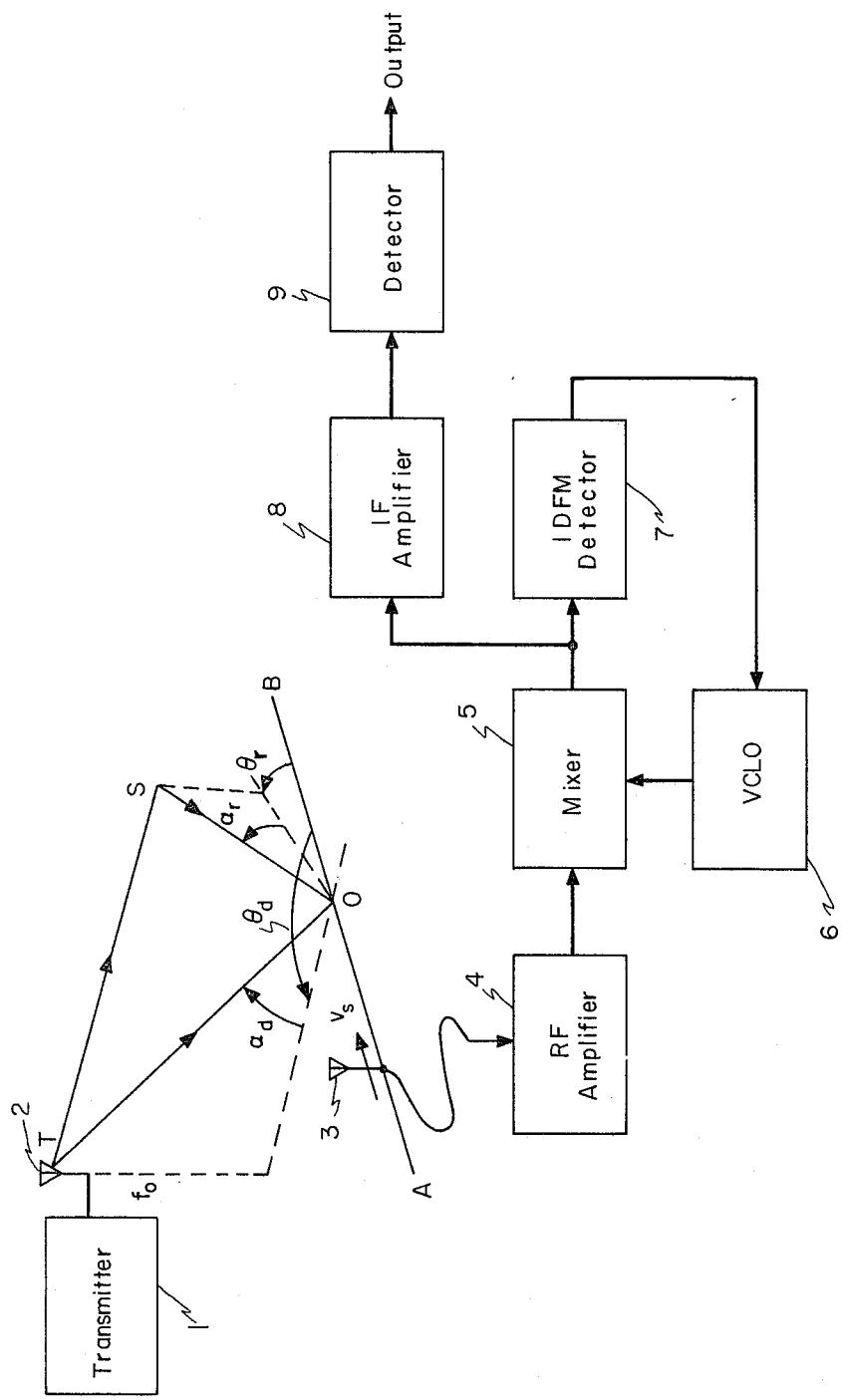
Figure 2:
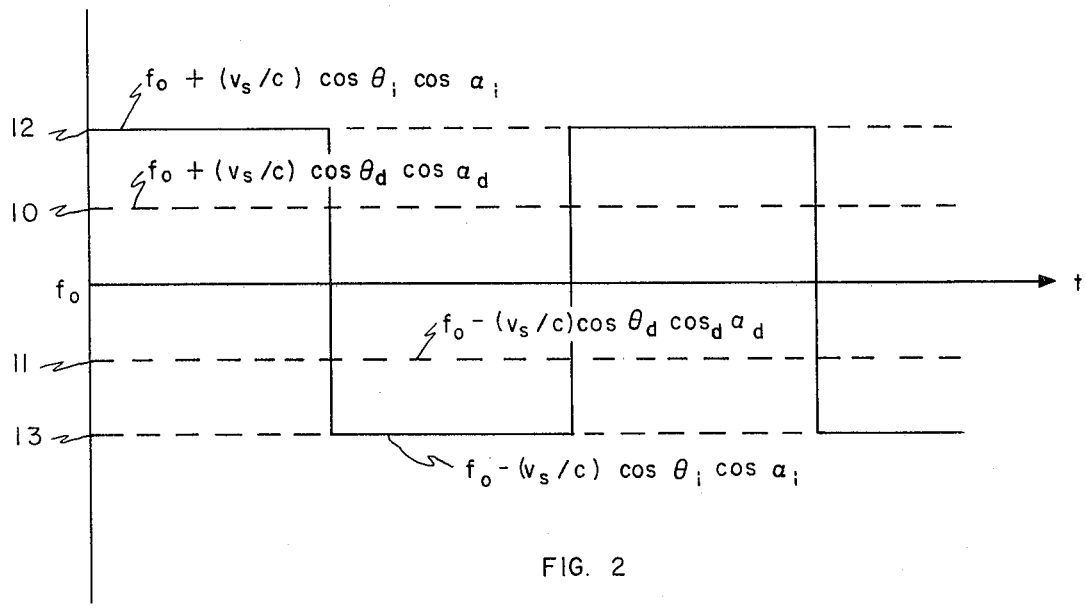
FIG. 2 shows a waveform illustrating the time and direction dependence of the signal frequency as received by an IDFM receiver in accordance with this invention.

With specific reference to FIG. 1, a transmitter 1 supplies a signal at a carrier frequency $f_o$ to a transmitting antenna 2. The modulation of the signal by the desired information-carrying waveform may be of any of the types used in the art. For specific illustration here only, three representative types of modulation will be discussed, namely, frequency modulation (FM), pulse-code modulation phase modulating the carrier (PCM/$\phi$M) and linear modulation (AM, SSB, DSB, VSB). In all cases, if a motion is imparted to the transmitting element 2 or the receiving element 3, or if such a motion is effectively simulated by commutating the transmitter output or the receiver input terminals sequentially among a sequence of radiating or receiving elements, respectively, such motion will induce a corresponding frequency modulation of the reference carrier of the radiated or the received signal, by virtue of the well-known doppler effect. Indeed, if the said applied or simulated motion traces a line of motion (LOM) A-B, say, at a uniform speed $v_s$ forward and back, as illustrated in FIG. 1, then for the relative positions of transmitter T and receiving antenna line of motion A-B shown in FIG. 1, the frequency of a spectral line at $f_o$Hz reaching the receiver along the propagation path T-O will appear to execute the modulation illustrated in FIG. 2, wherein the received frequency has the values $f_o[1 \pm (v_s/c)\cos\theta_d\cos\alpha_d]$. The frequency $f_o$ of a spectral line will appear to be detuned to only one of the said extreme values indicated in FIG. 2 if the line A-B is traced at uniform speed $v_s$ in one direction only, say from A to B always, with a sudden jump from B back to A. The same radiated spectral line arriving at the receiver via a reflected path T-S-O, such that the azimuth and elevation angles of the ray S-O are $\theta_i$ and $\alpha_i$, will appear to have a frequency-shift modulation between the values $f_o[1 \pm (v_s/c)\cos\theta_i\cos\alpha_i]$, also indicated in FIG. 2, or to be detuned to one of these extreme values if the line A-B is traced at uniform speed, $v_s$, always in one sense (say A to B with a sudden jump back to A). The ray S-O in FIG. 1 could also be the normal to the wavefront of some signal originating at a different transmitter which also radiates a frequency $f_o$Hz, rather than the arrival leg of a multipath replica of the signal radiated from T. In any case, it is clear that the received frequency will have different values for different values of $\theta$ or of $\alpha$, or of both.

Accordingly, the induced directional frequency modulation (IDFM) causes differences in direction of arrival at the receiver to result in increased frequency separation, or increased instantaneous frequency difference. This automatically facilitates the separability of signals arriving from different directions at the receiver for all types of modulation.

In general, the effectiveness of all known methods for rejecting or suppressing interference in the reception of a desired signal increases directly with an increase in the rms instantaneous frequency difference, $\sigma_{\omega d}$, between the signal and the interference; i.e., with $$\sigma_{\omega d} = 12 \sqrt{\overline{\omega_d^2(t)}} \\ = \left[ \overline{(\omega_s - \omega_i)^2 + [\dot{\psi}_s(t) - \dot{\psi}_i(t)]^2} \right]^{\frac{1}{2}} \quad (1)$$

where
$\omega_d(t)$ = the instantaneous frequency difference between the two signals
$\omega_s t + \Psi_s(t) + \phi_{os}$ = the instantaneous phase of the desired signal, $\omega_s$ being its carrier reference frequency, $\phi_{os}$ its carrier initial phase, and $\Psi_s(t)$ its phase modulation function
$\omega_i t + \Psi_i(t) + \phi_{oi}$ = the instantaneous phase of the undesired signal, or interference, $\omega_i$ being its carrier reference frequency, $\phi_{oi}$ its carrier initial phase, and $\Psi_i(t)$ its phase modulation function and the dot over the $\Psi$ functions denotes the derivative with respect to time, $t$. From the discussion above related to FIG. 2, it can be seen that IDFM induced by moving the antenna at uniform speed along a rectilinear POM increases mainly the carrier frequency difference $\omega_s - \omega_i$ by adding a term given by the magnitude of $$(v_s/c)[f_s \cos\theta_d \cos\alpha_d - f_i \cos\theta_i \cos\alpha_i] \quad (2)$$

where $f_{s,i} = \omega_{s,i}/2\pi$.

It can readily be shown that if the line of motion (LOM) is of length D/$\lambda_o$ wavelengths at the carrier frequency $f_o$Hz, and if the speed of antenna motion $v_s$ is specified in terms of the number $f_m$ of complete cycles of sweep in both directions of the LOM length D, then the IDFM frequency difference given by Equation (2) can be expressed as $$2(D/\lambda_o)f_m[(f_s/f_o) \cos\theta_d \cos\alpha_d - (f_i/f_o) \cos\theta_i \cos\alpha_i] \quad (3)$$

where $f_o$ is taken as a nominal operating frequency. Note, for quantitative illustration, that for D/$\lambda_o$ = 50 and $f_m$ = 1 kilocycles/sec $$2(D/\lambda_o)f_m = 100 \text{ kHz} \quad (4)$$

and for

D/$\lambda_o$ = 100 and $f_m$ = 100 cycles/sec $$2(D/\lambda_o)f_m = 20 \text{ kHz} \quad (5)$$

Consequently, for values of the bracketed difference in Equation (3) in excess of 0.1 (i.e., nominal radial direction angle difference in excess of about 4°), the frequency difference added by IDFM will range between 10 kHz and 100 kHz for (4) and between 2 kHz and 20 kHz for (5).

Figure 3:
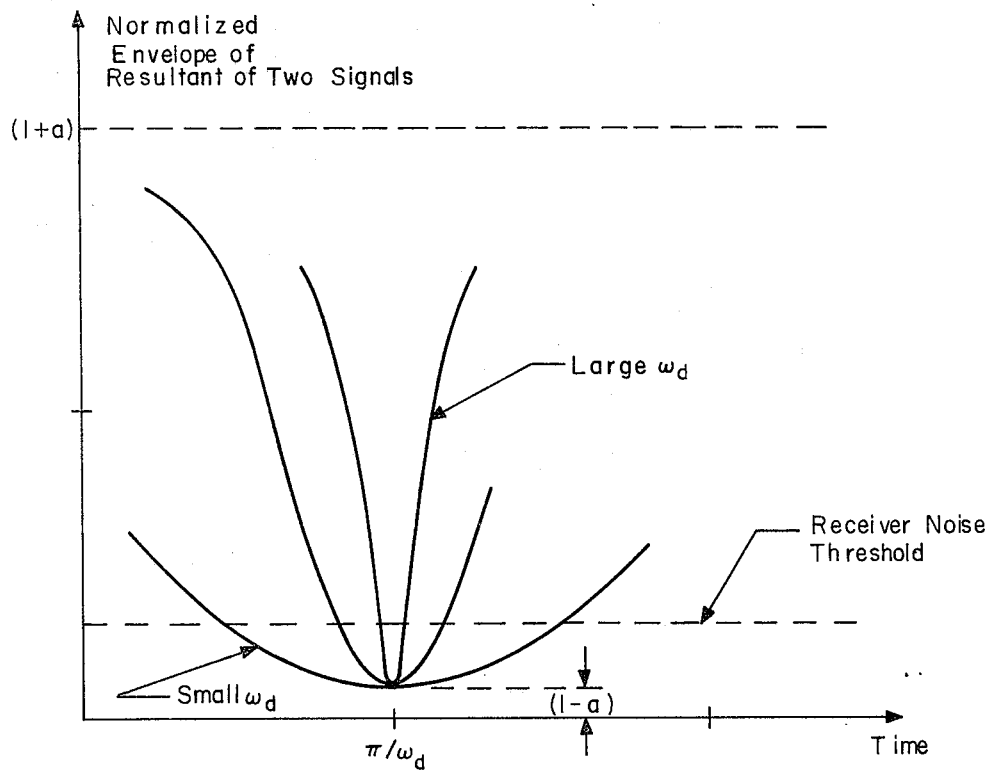
FIG. 3 illustrates the fluctuations in the envelope of the resultant of two sinusoidal carriers differing in frequency by $\omega_d$ rad/sec and having relative amplitudes 1 and $a<1$.

In order to clarify the effect of rms instantaneous frequency difference upon the interference rejection capability of a receiver, refer to FIGS. 3 and 4.

FIG. 3 illustrates the instantaneous envelope fluctuations of the resultant of two sinusoidal carriers that differ in frequency by $\omega_d$ rad/sec and have amplitudes $E_s$ and $aE_s$. The minimum value of the envelope is given by $E_s(1-a)$ and hence this minimum goes to zero as $a$ approaches unity. The practical significance of this is that in the zones of severe potential interference (i.e., where the two signals will be equal or nearly equal in strength), the instantaneous envelope of the resultant of the two signals will drop on its downward swings below (the amplitude limiting threshold of an FM or $\phi$M receiver and/or) the demodulator noise threshold. Consequently, noise bursts will occur in the baseband output corresponding to the time intervals in which the envelope of the resultant signal is below the (limiting and/or) demodulator noise threshold.

The output noise bursts will recur at a frequency of $\omega_d/2\pi$ bursts per second. The spectrum of such a train consists of a zone centered at 0 Hz plus other zones centered at $\pm\omega_d/2\pi$ Hz and all harmonics of it. The spectral zones that contribute to the output are those that overlap the output lowpass filter passband. Thus, the lower the value of the frequency difference, $\omega_d$, the higher the level of the total burst noise in the output.

Under certain types of multipath conditions characteristic largely of microwave links between stationary terminals, the frequency difference $\omega_d = 0$ and the modulation delay difference between the different paths is negligible or zero. Under these conditions, the slowly varying RF phase difference $\Psi_{as} - \Psi_{oi}$ will cause resultant envelope nulls of long duration in the maximum interference areas (i.e., within the zones where $a \approx 1$). Such nulls disrupt bit synchronization in digital systems and cause loss of data at least for the duration of a null. With reference to FIG. 4, the level of total output disturbance (or non-signal component) is at a peak for $\omega_d = 0$ in all but the FM systems.

For small values of $\omega_d/2\pi$ (e.g., less than a few hundred Hz), the durations of the resultant envelope nulls are still long enough to cause severe distortion of the receiver output. FIG. 3 illustrates the dependence of the disruptive null duration upon $\omega_d$.

For frequency differences of 300 Hz and greater but falling within the desired baseband spectrum (e.g., within the audio band for a speech system), a beat-frequency disturbance is added within the desired baseband. In speech systems (including AM, SSB, DSB and FM) an annoying audible whine will result at all times in the AM-type systems but only during the intervals of no modulation between words in FM. In FM systems, the level of the total output distortion (or non-signal component) due to interference rises to a peak value, as illustrated for speech systems in FIG. 4, and drops off for values of the rms instantaneous frequency difference, $\sigma_{\omega d}$, beyond the nominal cutoff of the output baseband filter.

The rectilinear motion described above for the receiving or the transmitting antenna can be simulated by successively connecting the output of one fixed receiver (for receiving) or transmitter (for radiating) to discrete stationary antennas arranged in a straight line of the desired length and orientation. For a given desired length of line and linear speed of traversal, the number of discrete antennas to use and the manner of switching antennas on or off (i.e., the blending function) can be determined readily by first recognizing the process of simulation of antenna motion by successive energization of discrete, stationary antenna elements as a process of discrete sampling of the motion.

In IDFM/T, if the transmitting antenna motion is simulated by the "sampling" approach, the manner in which the antenna elements are energized should employ a switching or commutation (or blending) function designed to suppress the sampling spectral zones created around the central modulated carrier in order to prevent radiation of objectionable levels of spectral splatter.

A number of specific embodiments of the IDFM technique for rejecting interference will now be described for illustration only and not to limit in any way the scope, intent or method of implementation of the present invention.

Illustration of the application of IDFM interference rejection in FM reception is made first with reference to FIG. 5. In this figure, 14 represents a sequence of receiving antennas arranged along a straight line, all connected to a commutator 15 which connects them sequentially to the input 16 of an FM receiver. In effect, the commutator sweeps the input 16 of the receiver over the sequence of antennas in such a way as to simulate a receiving antenna in repeating motion at a uniform speed from one end of the line of antennas to the other (without or with alternation of the sense of the motion). In a practical implementation, an RF amplifier such as 17 may be desired next to each antenna to amplify the antenna output prior to subjecting it to the loss and the associated degradation in noise figure in the cable connecting it to the commutator. The output of RF Amplifier 17 is applied at the signal input of Mixer 18. The local oscillator input to Mixer 18 is provided by a voltage-controlled local oscillator, VCLO 19. IF Amplifier 20 provides both predetection filtering and amplification of all signals falling within the nominal RF bandwidth of the desired ensemble of signals for which the receiver is intended. The High-Capture FM Detector 21 employs one or more signal capture enhancement techniques and fast-acting demodulator circuits of types well-known in the art. The Output 22 of the High-Capture FM Detector is heavily filtered in IDFM Low-Pass Filter (LPF) 23 to extract the IDFM frequency-shift waveform of the captured desired signal and apply it to VCLO 19 to provide automatic frequency control (AFC) or frequency-compressive feedback (FCF) wipe-off of the IDFM on the desired signal component. In the case of bipolar or alternating IDFM, the alternating waveform of the residual IDFM in the Output 22 will not disturb the desired information waveform or subchannels if the antenna sweep (or motion) repetition frequency $f_m$ is chosen to fall in a band of frequencies not occupied by the information waveform spectrum (e.g., below 300 Hz in a 300–3300 speech transmission system).

Figure 6:
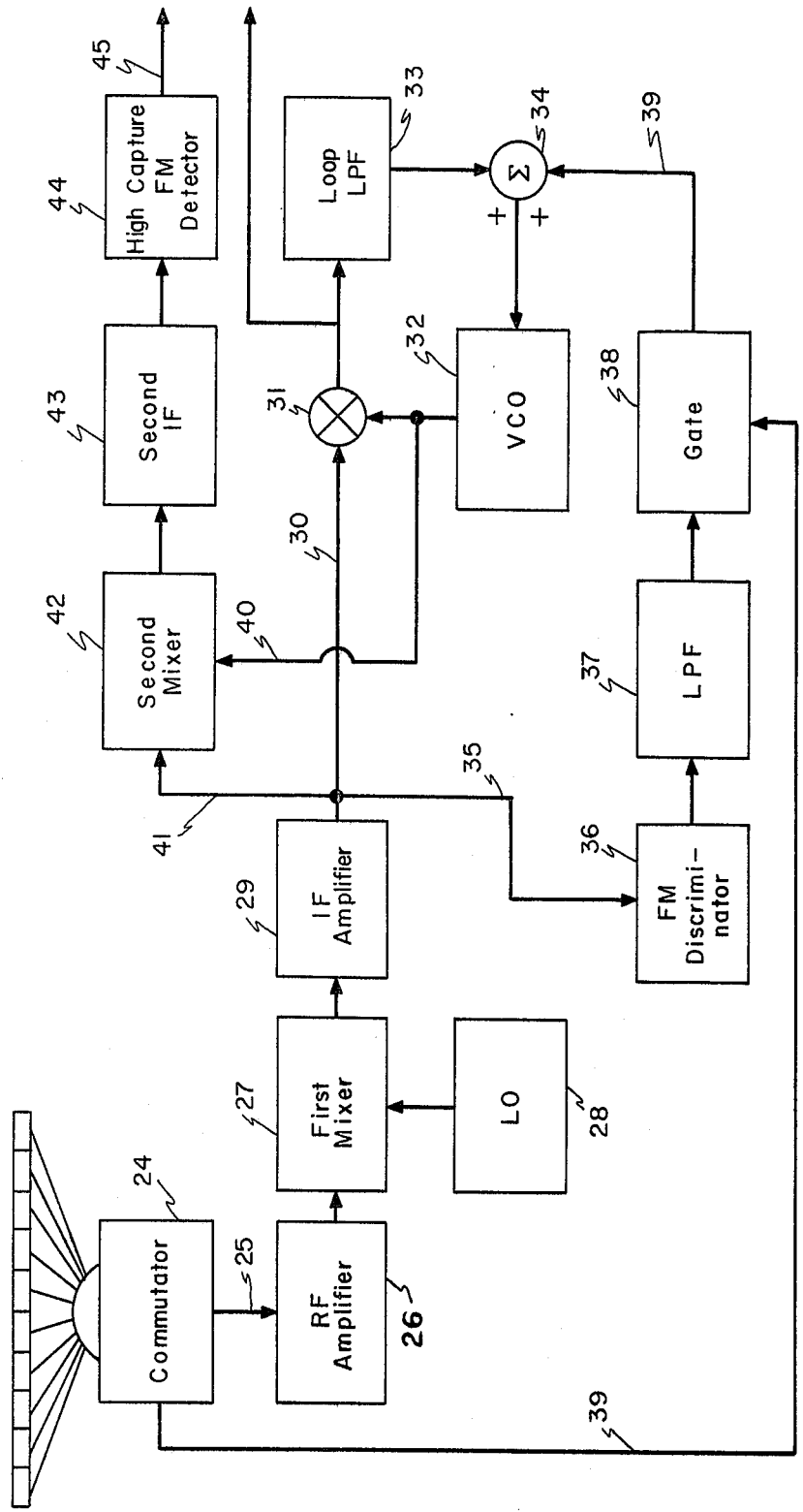

In the FM receiving system illustrated in FIG. 6, the subtraction of the IDFM of the desired signal is effected in open-loop manner by means of a second mixing process in Second Mixer 42. The signal plus interference, each with a different IDFM, are delivered by Commutator 24 to the input 25 of RF Amplifier 26. The First Mixer 27 employs a fixed LO 28 to down-convert the input frequencies to a convenient first IF. The output 30 of IF Amplifier 29 drives a phase-locked loop (PLL) intended to generate an LO signal at LO input 40 to the Second Mixer 42 whose frequency executes exactly the IDFM of the desired signal component in the input. Thus, input 30 is applied to the phase-locked loop phase detector 31 to yield, after low-pass filtering by Loop LPF 33, the control signal that locks the VCO frequency (and phase) to the residual carrier component of the desired signal in 30 at each of its IDFM-shifted frequency values (the positive and/or the negative shifts shown in FIG. 2). The closed-loop bandwidth when locked to the current frequency and phase of the FM carrier component should preferably be in the order of 100 Hz, but the IDFM frequency shifts may be several kHz, even several tens of kHz in some applications. It is therefore generally necessary to provide a frequency acquisition aid to extend the locking range of the carrier-tracking phase-locked loop and to enable the VCO 32 frequency to shift quickly to the new IDFM value after each frequency jump in the case of two-level or multi-level frequency-jump IDFM. This is accomplished in FIG. 6 by channeling output 35 of IF Amplifier 29 to a High-Capture FM Detector 36 whose output is filtered by LPF 37 to exclude all non-IDFM frequency fluctuations on the desired signal. The output of LPF 37 is a DC level proportional to the shift of the desired carrier level from its would-be value in the absence of IDFM. This DC level is applied to VCO 32 for a small fraction of the half-period $1/(2f_m)$ sec after a transition to a new IDFM shift value has occurred. Gate 38 is opened up by a trigger delivered via output 39 from Commutator 24 at the instant the sense or the speed of the sweep along the antenna line of motion is changed. As soon as the VCO frequency is shifted to the new value, Gate 38 disconnects the output of LPF 38, thus preventing the noise passed by LPF 38 (in a bandwidth that must be much larger than the closed-loop bandwidth in order not to round-off the detected IDFM steps) from degrading the VCO signal quality.

Thus, with the frequency shifts of VCO 32 accurately matched to the IDFM shifts of the desired signal carrier component, the IDFM on the desired signal can be subtracted out by Second Mixer 42. This allows the bandwidth of Second IF 43 to be narrowed down to the minimum required to accommodate the desired signal without IDFM, which together with the further discrimination against the interference (with a substantial continued IDFM on it) offered by the High-Capture FM Detector 44, enhances the interference rejection capability of the receiver.

When applied to the detection of FM signals with an unusably low carrier component, it may be necessary to employ a limited amount of frequency-compressive signal modulation feedback from the output of FM Discriminator 36 to LO 28 in order to boost the carrier component in the signal delivered at output 30.

Of course, if the increased predetection noise bandwidth required to accommodate the signal with IDFM is not objectionable, and if the IDFM waveform can be effectively suppressed in the baseband output, the subtraction of the signal IDFM prior to final demodulation by any method (such as those of FIGS. 5 and 6) becomes unnecessary. The difference in IDFM between the desired and undesired signals present at input 35 to FM Discriminator 36 enhances the ability of a High-Capture FM Detector at 36 to reject the interference and deliver satisfactory signal capture performance at the output of 36.

The subtraction of a fluctuating or alternating IDFM/T can be effected by appropriate IDFM/R; i.e., by executing or simulating receiving antenna motion which effectively cancels out IDFM on the incident desired signal, induced by motion of the transmitting antenna.

If the antenna motion in IDFM/T and/or IDFM/R is performed at uniform speed and always from one end of the line of motion (LOM) to the other (i.e., the motion is always from A to B in FIG. 1 and no reversal is made in the sense of the motion every time the antenna reaches end B, but rather a sudden jump back to A is made) then the frequency shift introduced by IDFM is equivalent to a shift or detuning of the spectrum to one side of the operating carrier frequency. Fluctuations in the IDFM will then result only from fluctuations in the angle of arrival at the receiver and/or from fluctuations in the operating frequency $f_o$. The subtraction of slowly changing IDFM signal frequency shift in the receiver can then be effected simply by manual retuning or by automatic frequency control (AFC) to favor the desired signal over the differently detuned interference.

Embodiments of this invention applicable to phase modulation and digital phase-keyed signals are shown in FIGS. 7 and 8, again for illustration only and not to limit those versed in the art of receiver design in designing methods of implementing this invention. Again, phase-locked loop (PLL) 50 is employed to establish a reference oscillation out of VCO 52 locked to the IDFM-modified carrier reference signal of the input signal. The functional blocks enclosed within the dashed box 47 are necessary only for phase-reversal keyed signals (which have no carrier component present) or generally for phase-shift-keyed signals (as well as DSB suppressed or reduced-carrier amplitude modulation) with a weak carrier component. Alternatively, one may employ the well-known Costas phase-locked loop which is well suited to these types of modulated signal to establish the desired receiver reference signal locked to the carrier reference of the desired input signal.

Figure 7:
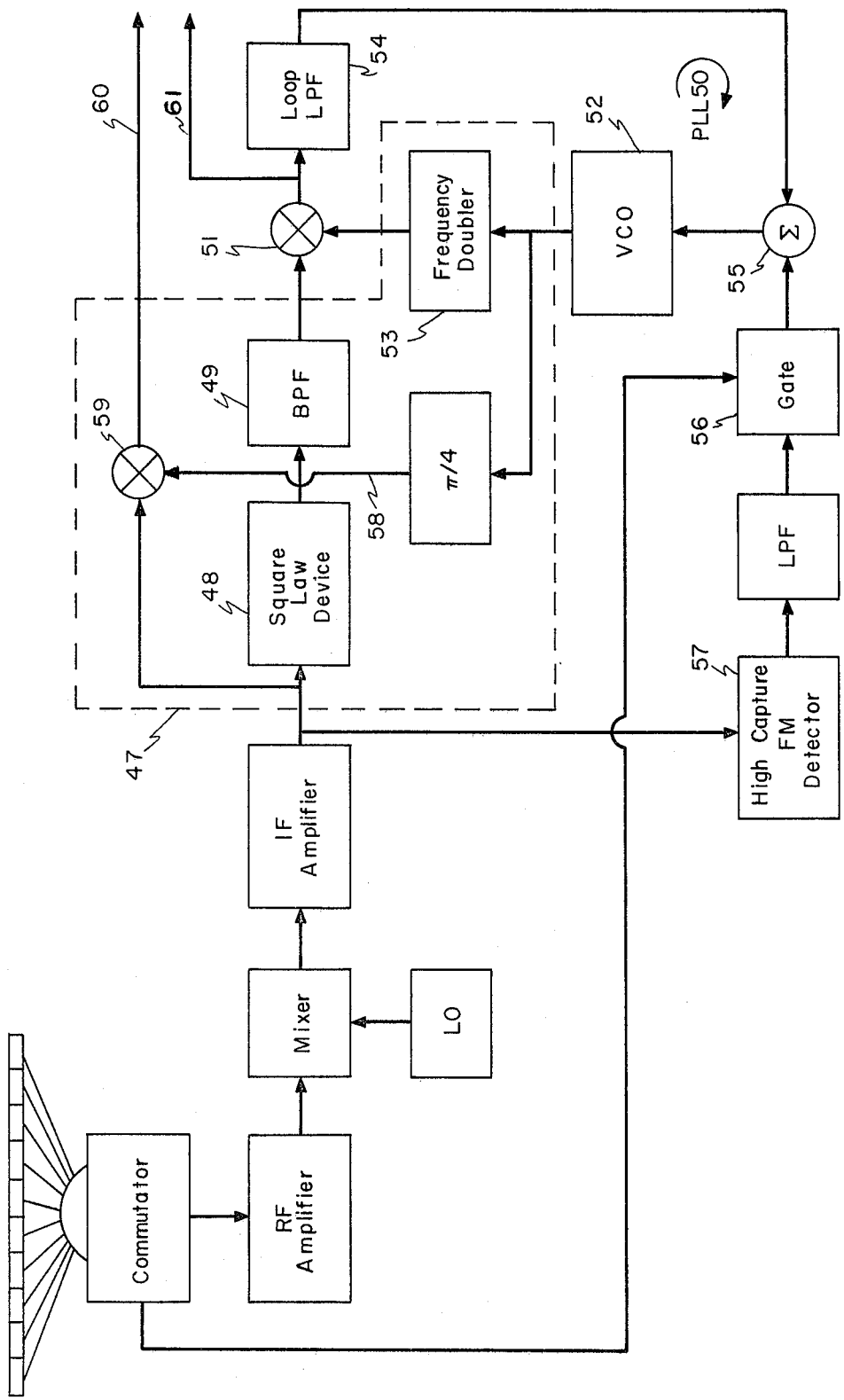
FIGS. 7 and 8 show detailed functional block diagrams of two forms of an IDFM inteference rejection receiving system for PCM/$\phi$M including a commutator for simulating a receiving antenna that moves along a rectilinear sequence of positions in accordance with this invention.

With reference to FIG. 7, the Square-Law Device 48 creates a sinusoidal carrier component at double the frequency of the reference carrier of the input signal. After bandpass filtering in BPF 49 to limit the noise bandwidth, the double-frequency component is applied to the phase detector 51 of PLL 50. The control signal in the output of the LOOP LPF 54 is applied to VCO 52. Again, frequency acquisition by the PLL is aided by establishing, by means of High-Capture FM Detector 57, a close estimate of the change in the control signal that would draw the VCO frequency to within the phase lock-in range around abruptly assumed values of the input signal frequency due to IDFM. Such close estimates are gated in by Gate 56 triggered again by the Commutator. The Gate 56 turns off automatically after the PLL 50 establishes frequency lock. The PLL then establishes phase lock and narrows down the noise bandwidth. After an appropriate phase adjustment, the VCO 52 provides input 58 to multiplier 59 in order to effect the desired phase demodulation. (A different phase adjustment would be required for demodulation of DSB/AM signals.)

Figure 8:
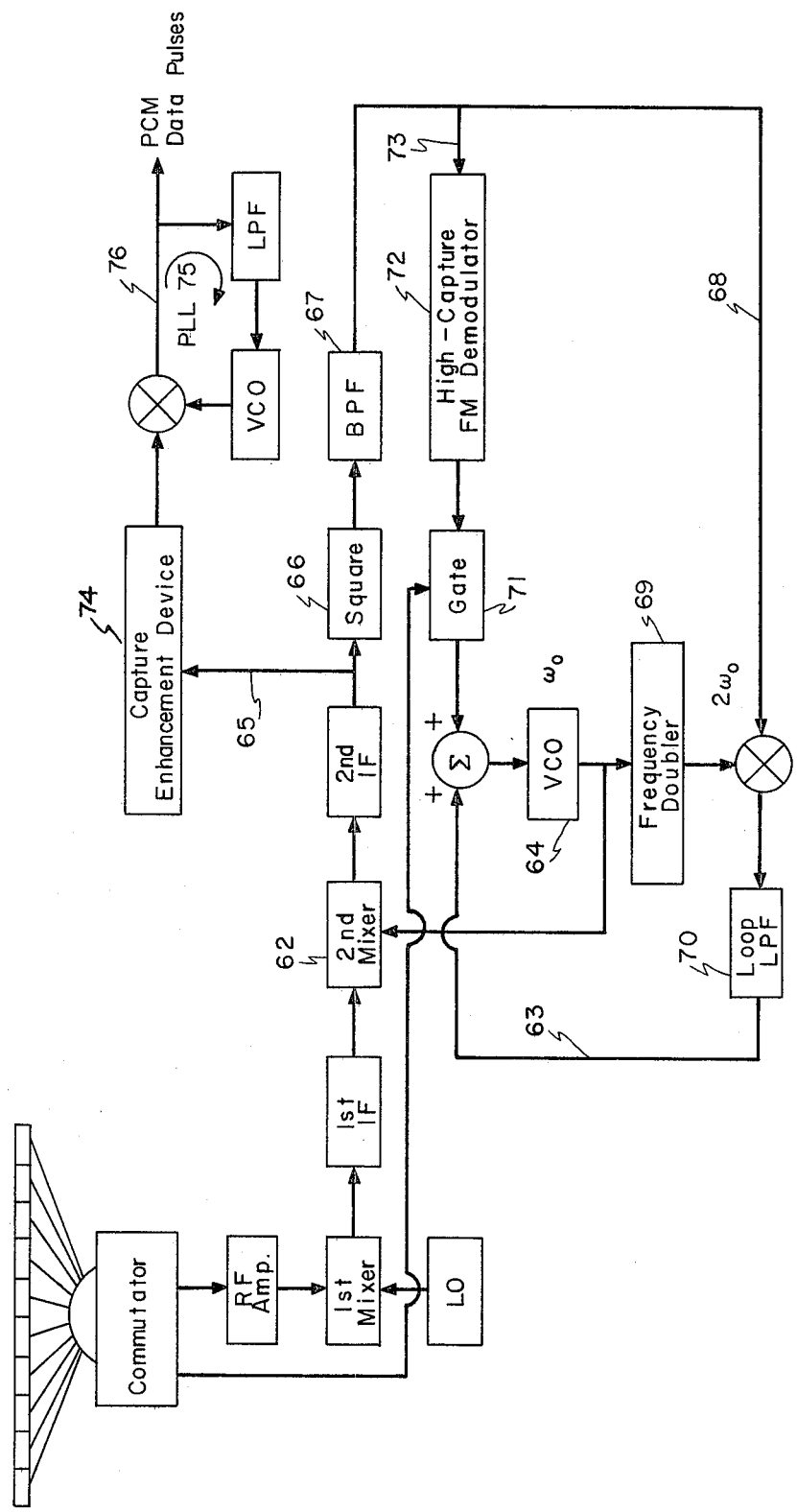

In the alternative scheme shown in FIG. 8, the VCO 64 is locked to the reference IDFM-shifted carrier of the input signal by a frequency-compressive feedback arrangement through the Second Mixer 62. This results in the signal with a greatly reduced IDFM at 65, which is then operated on by a Capture Enhancement Device such as a Baghdady Dynamic Trap or Feedforward circuit to cancel out the undesired signal. PLL 75 then delivers the output data pulses or baseband channels.

Figure 9:
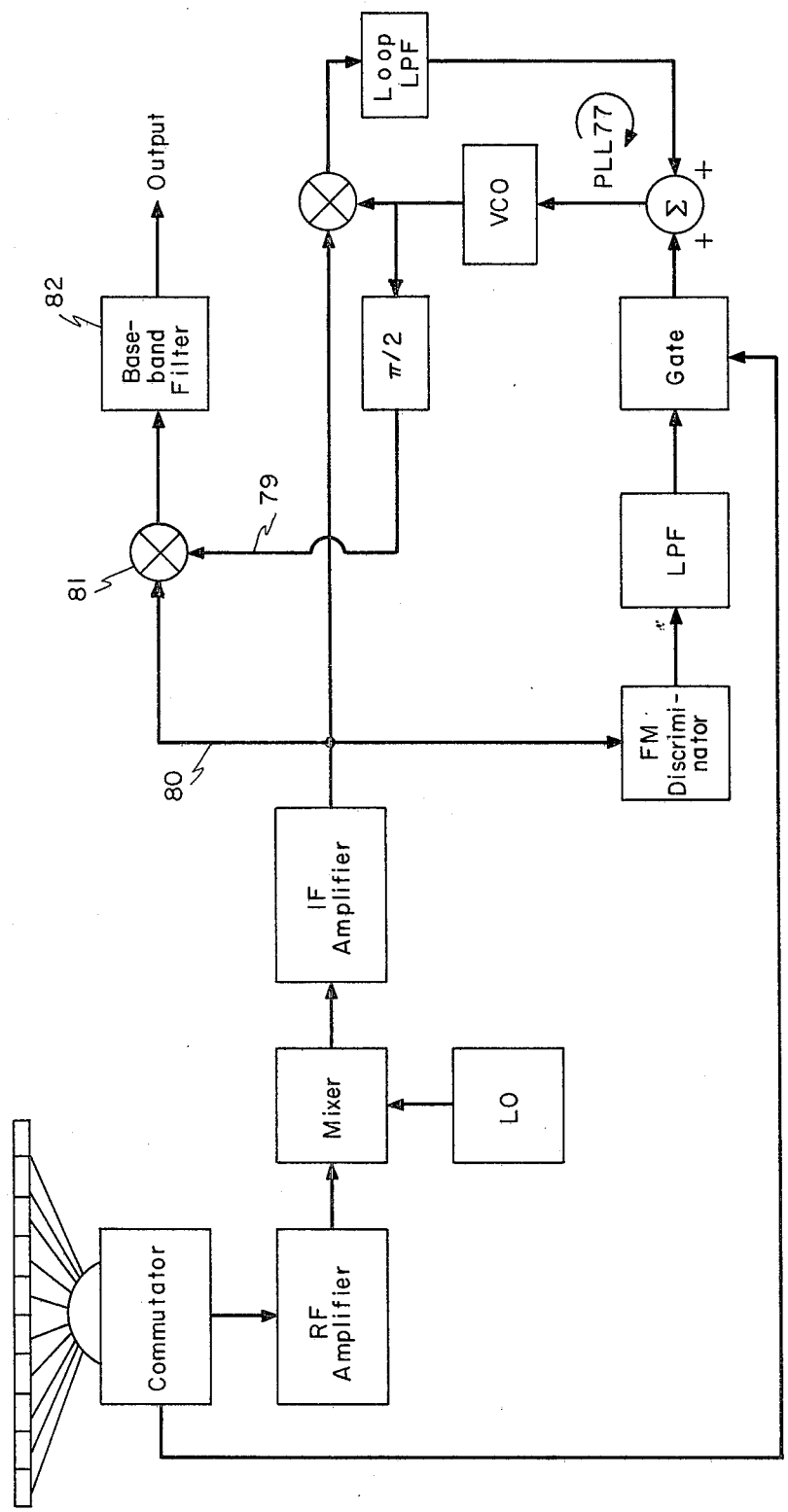
FIG. 9 shows a more detailed functional block diagram of one form of an IDFM inteference rejection receiving system for linear modulation (AM, SSB, DSB, etc.) including a commutator for simulating a receiving antenna that moves along a rectilinear sequence of positions in accordance with this invention.

The scheme shown in FIG. 9 illustrates a practical embodiment of this invention for all types of modulation derived from amplitude modulation (AM, SSB, DSB, VSB). PLL 77 (aided as before by an FM detector) maintains lock to the input carrier reference to provide at 79 a cophasal carrier for product demodulator 81.

It must be emphasized at this point that the desired signal may be the stronger (or strongest) signal or it may be the weaker of two signals. In any case, the high-capture schemes mentioned above could generally be "selective-capture" schemes that are adjustable to suppress the undesired signals, or enhance the desired one, regardless of which is stronger.

It can also be seen from the preceding discussion that, with the aid of selective capture circuits, the signals overlapping in the input may be separated by IDFM and delivered separately in the output. Multipath replicas of the same signal separated by IDFM-based schemes, can be combined to enhance the quality of the received data.

A measure of diversity against interference can be achieved by using two orthogonally oriented antenna lines of motion and combining the desired signal components from each after IDFM wipe-off, pre-detection or post-detection. Further diversity improvements can be achieved by employing two or more spaced receiving stations with IDFM/T or IDFM/R, and combining the desired signal components or the data derived from each separate antenna path of motion (POM).

For purposes of illustration of one way in which the IDFM techniques can be employed to achieve diversity benefits against interference, consider the situation in which the part of the IDFM/R system at the receiving end consists of two crossed rectilinear arrangements, E-W and N-S, of sequentially activated receiving antenna elements. Each antenna element is connected momentarily, in succession, to one down-converter for each line of antennas. The down-converters translate the frequencies received by the elements of each sequence to subchannel intermediate frequencies $f_1$ and $f_2$. The subchannel frequencies thus distinguish the receiving antenna sequences, and they can be processd by the IDFM receiver to provide replicas of the desired signal which, when combined, provide diversity combining improvements against the interference.

While there has been described what is at present considered representative embodiments of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. An apparatus for receiving signal waves of generally the same frequency from a plurality of different directions, and for selecting signal waves from a desired direction comprising:
    antenna means, having a receiving position, for receiving signal waves from a plurality of different directions;
    means for repetitively moving the receiving position along a predetermined path of motion thereby inducing direction dependant frequency modulation in the received signal waves; and,
    means for selecting signal waves from a desired direction responsive to the induced direction dependant frequency modulation of the received signal waves.

2. The apparatus of claim 1 wherein said selecting means includes:
    means for cancelling the direction dependant frequency modulation induced in the signal waves from the desired direction; and,
    filter means, receiving the signal waves from the cancelling means, for passing the signal waves from the desired direction, and rejecting signal waves from other of the plurality of directions.

3. The apparatus of claim 1 wherein the predetermined path of motion is rectilinear.

4. The apparatus of claim 1 wherein the predetermined path of motion is a closed curve.

5. In a communication system wherein signal waves of generally the same frequency are provided to a plurality of transmitters, each having a signal wave radiating position, and wherein the signal waves are transmitted from the transmitters to a receiver, having a signal wave receiving position, the improvement comprising:
    means for rejecting interference between signal waves transmitted by the plurality of transmitters including:
        means for repetitively moving at least one of said radiating and said receiving positions along a predetermined path of motion, thereby inducing direction dependant frequency modulation in the received signal waves; and,
        means for rejecting signal waves from at least one of the plurality of transmitters responsive to the induced direction dependant frequency modulation of the signal waves.

6. In a system in which signal waves are radiated from at least one radiating position and the signal waves are received at a receiving position from a plurality of different directions, a method of suppressing interference by rejecting signal waves from at least one of the plurality of directions comprising the steps of:
    repetitively moving one of said radiating and receiving positions along a predetermined path of motion thereby inducing direction dependant frequency modulation in the received carrier waves; and,
    rejecting received signal waves from at least one of the plurality of directions by suppressing signal waves responsive to the induced direction dependant frequency modulation thereof.

7. The method of claim 6 wherein the one of said radiating and receiving positions is repetitively moved by moving an antenna element along the path of motion.

8. The method of claim 6 wherein said radiating position is repetitively moved by sequentially radiating signal waves from a plurality of antenna elements arranged along the path of motion.

9. The method of claim 6 wherein said receiving position is repetitively moved by sequentially receiving signal waves at a plurality of antenna elements arranged along the path of motion.

10. The method of claim 9 wherein said radiating position is moved to induce direction dependant frequency modulation in the signal waves and wherein the signal waves from the desired direction are selected by:
    repetitively moving the receiving position along a path of motion to cancel the direction dependant frequency modulation induced in the signal waves from the desired direction; and,
    filtering the signal waves from the receiving position to reject signal waves having direction dependant frequency modulation.

11. The method of claim 6 wherein the one of said radiating and receiving positions is moved along the path of motion at a plurality of different, generally uniform velocities in a known sequence.

12. A method for selecting signal waves received from a desired direction comprising the steps of:
   providing at least one position for radiating signal waves;
   providing at least one position for receiving the signal waves;
   repetitively moving one of said radiating and receiving positions along a path of motion thereby inducing direction dependant frequency modulation in the signal waves; and,
   selecting signal waves from the desired direction responsive to the induced direction dependant frequency modulation of the signal waves.

13. The method of claim 12 wherein the signal waves from the desired direction are selected by:
   modifying the signal waves from the receiving position to cancel the direction dependant frequency modulation induced in the signal waves from the desired direction; and,
   filtering the signal waves to reject signal waves having direction dependant frequency modulation and frequency modulation due to the cancellation of the direction dependant frequency modulation of the signal waves from the desired direction.

14. The method of claim 12 wherein the one of said radiating and receiving positions is moved by successive sweeps in the same direction along the path of motion to shift the frequency of the signal waves from the desired direction into a pass band and to shift the frequency of signal waves from other directions out of said pass band.

* * * * *